Oct. 29, 1957 R. G. WAMPACH 2,811,582

TELEGRAPH SIGNAL DISTORTION INDICATING APPARATUS

Filed Feb. 20, 1956 4 Sheets-Sheet 1

INVENTOR
ROBERT G. WAMPACH
BY Emery Robinson
ATTORNEY

TELEGRAPH SIGNAL DISTORTION INDICATING APPARATUS

Filed Feb. 20, 1956 4 Sheets-Sheet 2

INVENTOR
ROBERT G. WAMPACH
BY Emery Robinson
ATTORNEY

INVENTOR
ROBERT G. WAMPACH

BY Emery Robinson
ATTORNEY

INVENTOR
ROBERT G. WAMPACH

BY Emery Robinson
ATTORNEY 2,811,582
Patented Oct. 29, 1957

2,811,582

TELEGRAPH SIGNAL DISTORTION INDICATING APPARATUS

Robert G. Wampach, Roselle, Ill., assignor to Teletype Corporation, Chicago, Ill., a corporation of Delaware Application February 20, 1956, Serial No. 566,614

6 Claims. (Cl. 178—69)

Figure 1:
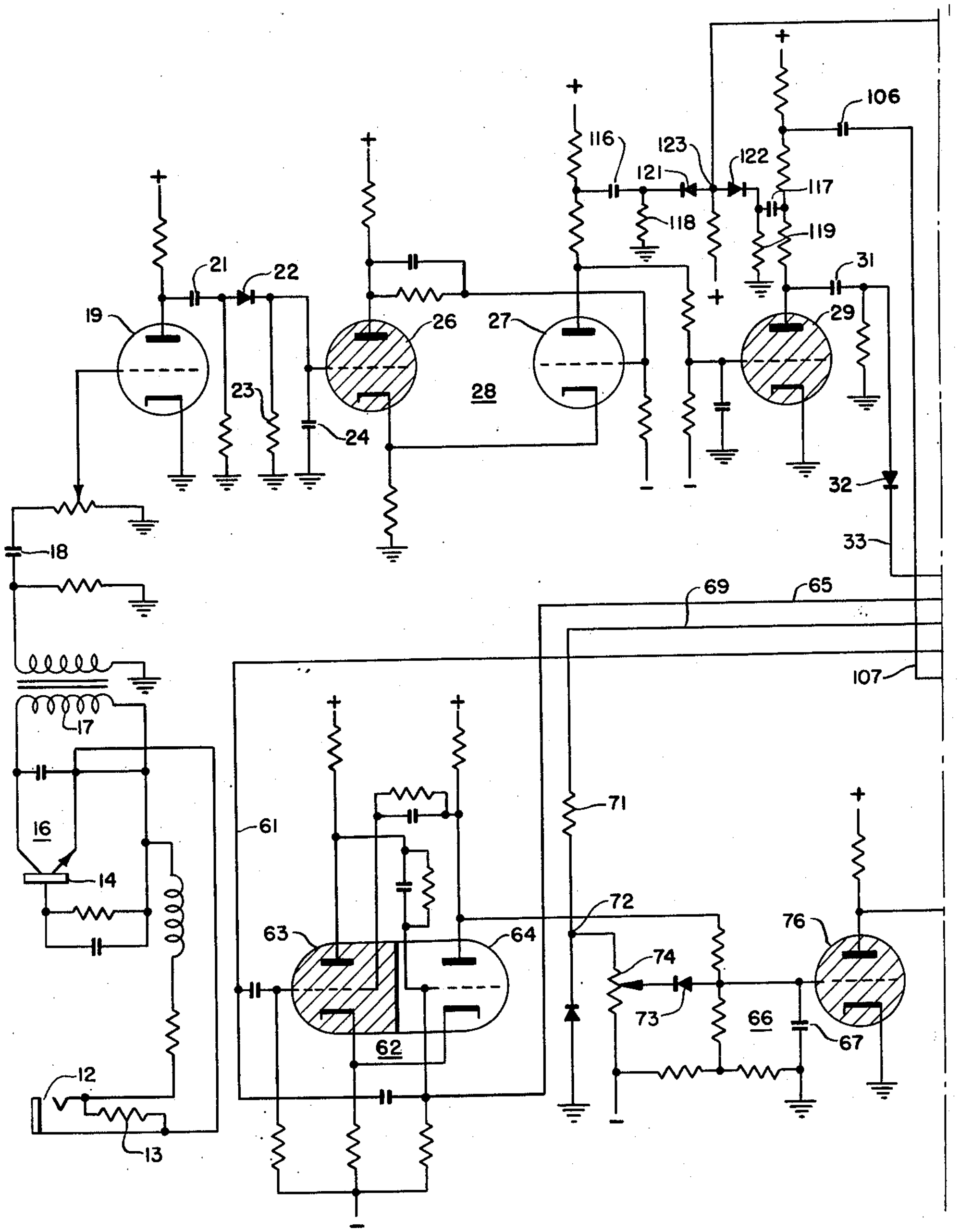

This invention relates to apparatus for indicating distortion in telegraph signals and more particularly to apparatus for visually displaying the type and character of distortion in each and every signal impulse of a multi-element telegraph signal.

In the normal operation and maintenance of telegraph communication installations it is necessary to make frequent appraisals of the telegraph signals being received and transmitted in order to ascertain the type and character of any distortion that may have been introduced into the signal impulses. This distortion usually occurs as so called bias or end distortion. Biased distortion is evidenced by an advancement (marking) or retardation (spacing) of the normal space to mark transition occurring between signal impulses with respect to the mark to space transition signifying the initiation of a start impulse which precedes each start-stop signal. In end distortion the isgnal impulses are characterized by an advancement (spacing) or retardation (marking) of the normal mark to space transition between signal impulses with respect to the mark to space transition occurring at the origin of the start impulse. Another type of distortion is manifest in signals wherein the energy levels of the marking or spacing impulses are below or above certain prescribed values.

All of these types of distortion affect the normal operation of the component telegraph equipments and if occurring in significant magnitude result in the improper or spurious function of the various component equipments.

It is a primary object of this invention to provide a simple reliable, and economical apparatus for analyzing telegraph signals to ascertain the particular type and character of distortion present in the signal impulses.

Another object of the invention is the provision of a signal distortion indicating apparatus that may visually display (1) the type and character of distortion in each and every signal impulse (2) the magnitude and shape of each and every signal impulse and (3) the peak distortion present in a series of signal impulses.

A feature of the invention resides in a distortion indicating cathode ray tube that is defocused during the interval between the receipt of intelligence signals to permit an electron beam to retrace to an initial start position in anticipation of the receipt of the next signal.

A further feature of the invention is the provision of certain novel control circuits that function to insure uniform operation of a cathode ray tube during receipt of a series of signals to be analyzed for distortion.

With these and other objects in view the invention contemplates a cathode ray tube that may be selectively controlled to visually indicate (1) the actual trace of the energy level of an incoming telegraph signal (2) the transitions in signal energy level with respect to a locally generated series of standard frequency pulses to indicate the type and amount of distortion present in each signal impulse and (3) the peak distortion in a series of signal impulses received over a period of time. Facilities are provided to selectively control the cathode ray tube and the other circuit components through the agency of a pair of phantastron oscillators. These phantastron oscillators are connected to control components so that one phantastron is timed to operate during the period in which a signal is received whereas the other phantastron is timed to execute two cycles of operation during the receipt of each signal impulse. Circuits interconnect these phantastrons so that the the first of character timer phantastron is initiated into operation upon the receipt of a start impulse preceding each signal and the initiation of operation of this character phantastron effectuates an initiation of operation of the second or impulse phantastron. Many unique circuits are provided to control the phantastrons and the other control circuitry to insure that each cycle of operation of the basic controls for the cathode ray tube are identical during each receipt of each signal.

Figure 2:
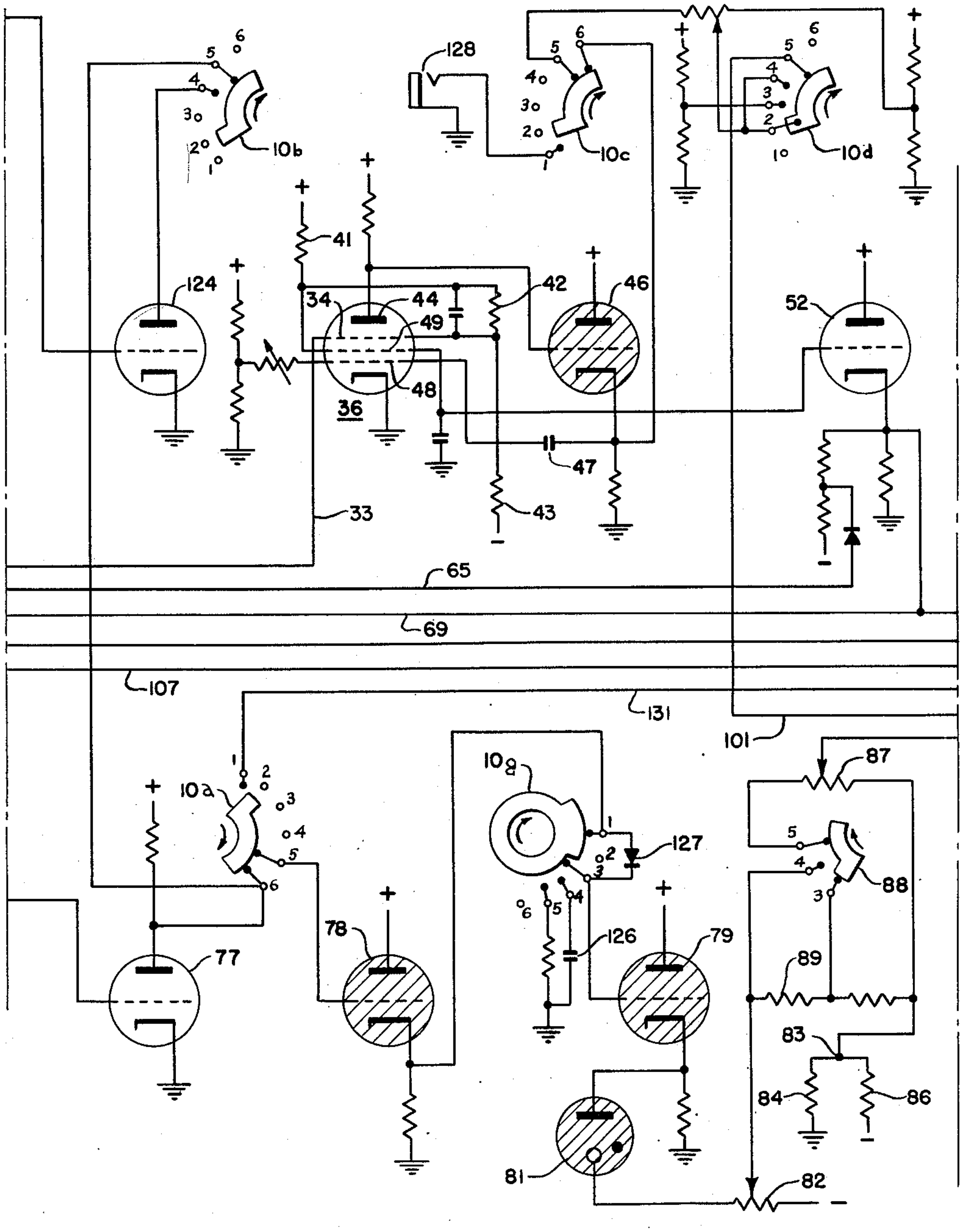
Figure 3:
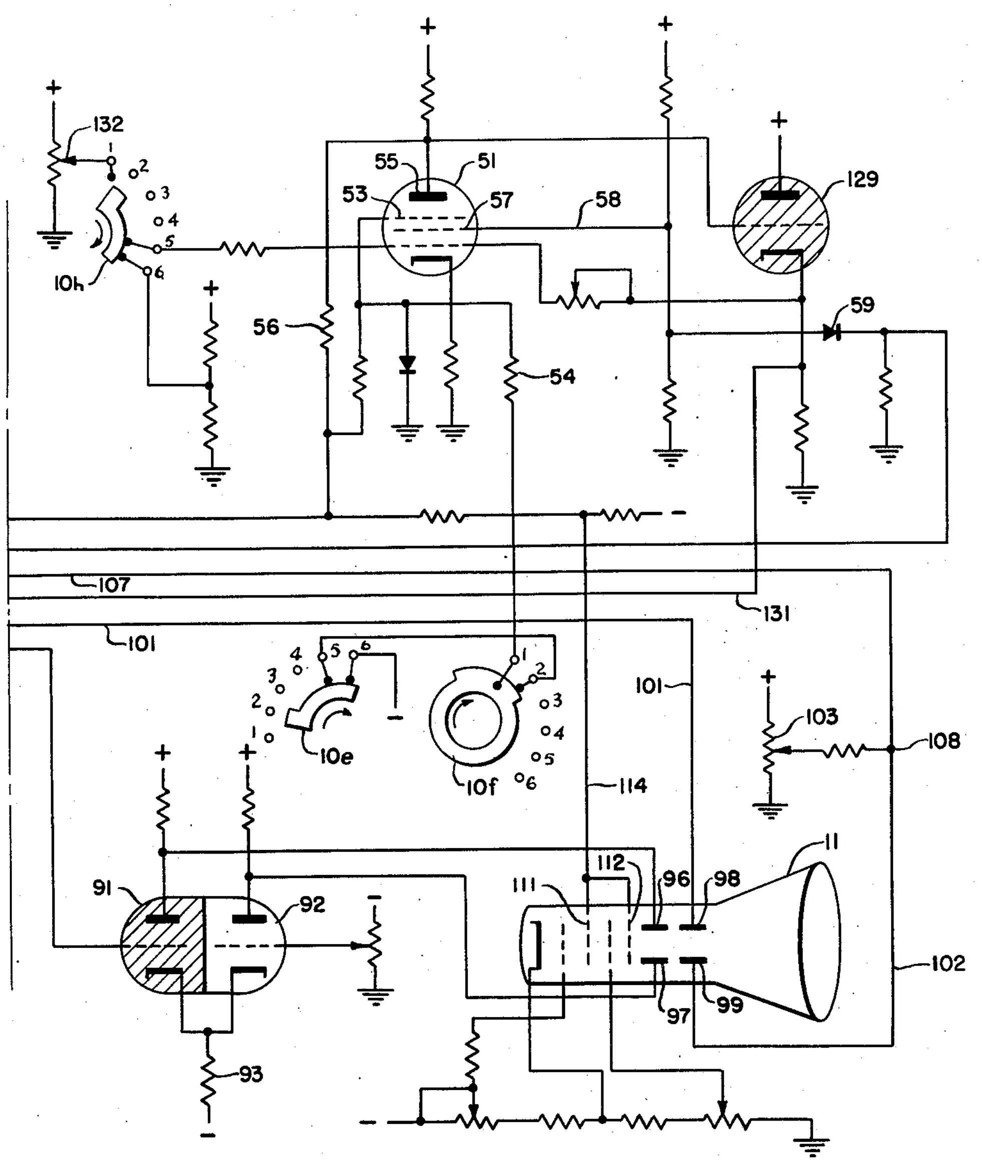
Figure 4:
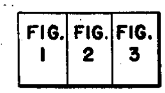
Figure 5:
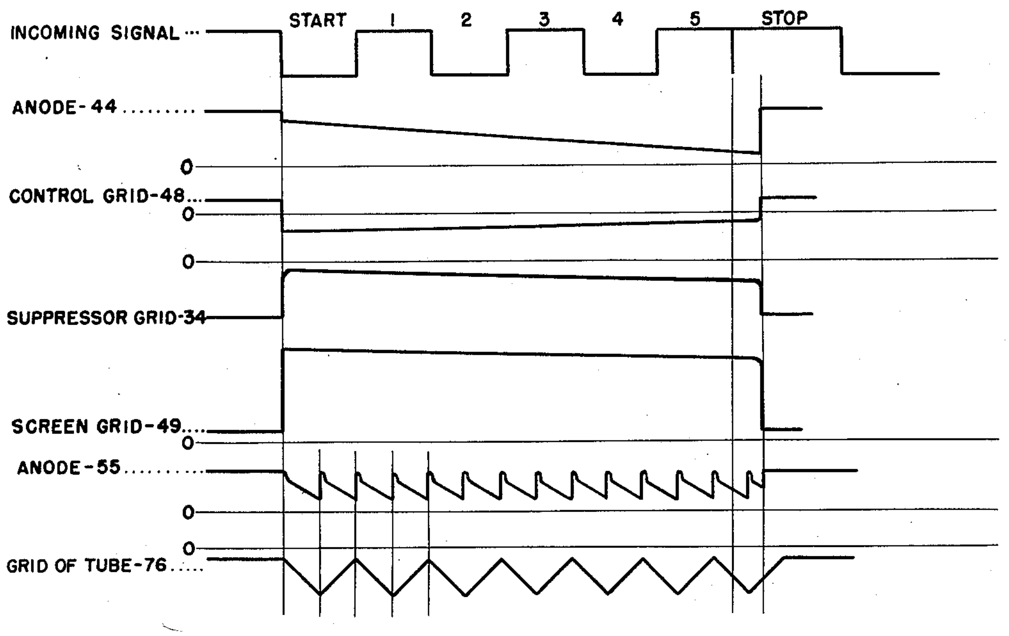

Other objects and advantages of the present invention will be apparent from the following detailed description when considered in conjunction with the accompanying drawings wherein:

Figs. 1, 2 and 3, when assembled in the manner indicated in Fig. 4, reveal a cathode ray tube control circuit for indicating the character of telegraph signals that embody the principal features of the present invention;

Fig. 5 is a timing diagram illustrating relative operating potentials on various critical elements when the apparatus shown in Figs. 1, 2 and 3 is operated to visually indicate the distortion present in each and every signal impulse; and Figs. 6, 7, 8 and 9 illustrate visual displays obtained on the face of the cathode ray tube in response to various settings of the control circuits shown in Figs. 1, 2 and 3.

Figure 6:
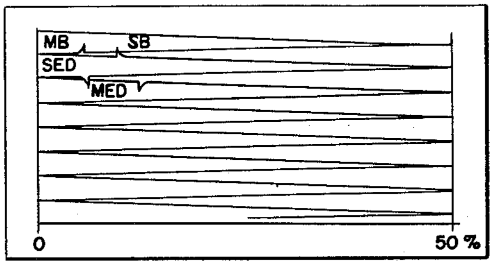

Referring to Figs. 1, 2 and 3 when assembled in the manner depicted in Fig. 4, a multi-section switch 10 is shown in a No. 2 contact position which permits the distortion indicator apparatus to display on a fluorescent screen of a cathode ray tube 11 the character of each incoming impulse of a start-stop type 5 unit code telegraph signal. When the circuits are so interconnected by the contactor 10, a visual display on the screen will be obtained such as shown in Fig. 6. The shaded tubes represent tubes that are normally conductive during the time in which no signals are being applied and steady current condition exists on an incoming transmission line.

In Fig. 1 there is shown a jack 12 through which incoming signals are impressed, however, during an idle condition in the transmission circuit a steady current or marking condition is impressed through the jack to effectuate the development of a voltage drop across a resistance 13. The positive voltage condition existing at the left-hand end of the resistance is applied to the base of a PNP type transistor 14 that forms a control element of a high frequency tone oscillator generally indicated by the reference numeral 16. Whenever a positive bias potential appears on the base of the transistor 14 the oscillator circuit will apply a tone output through an inductance 17. This inductance forms the primary of a transformer, the secondary of which is coupled through a condenser 18 to the control grid of an amplifier tube 19. The transformer provides a convenient means of electrically isolating the cathode ray tube 11 and associated control elements from the incoming signal line.

Tone oscillations impressed on the grid of the tube 19 cause an amplified tone condition to appear in the tube's anode circuit. Output from the anode circuit of this tube is impressed through an A. C. isolating condenser 21 to a diode rectifier 22 that functions to apply a unidirectional pulsating voltage condition to a filter comprising a resistance 23 and a condenser 24. Thereafter a substantially steady positive voltage condition is caused to be impressed on the grid of a tube 26. It may be thus appreciated that so long as a steady marking condition exists when the incoming signal line is connected to the jack 12 the tube 26 will remain in a steady state of conduction.

When the start impulse associated with an incoming signal is impressed at the jack 12 the oscillator 16 ceases to function and as a result the tube 19 ceases to produce the tone output. Due to the condenser 21 providing A. C. isolation between the anode of the tube 19 and the grid of the tube 26, the potential on the grid drops to render the tube 26 nonconductive. Immediately thereupon the anode potential of this tube rises to impress an increased potential condition on a grid of a tube 27 causing this tube to be placed in a conductive state. Tubes 26 and 27 are interconnected together to form a bi-stable multivibrator circuit generally designated by the reference numeral 28. As a result of the operation of the tube 27 the anode potential thereof will drop and this drop will be impressed on the grid of a buffer amplifier tube 29. The tube 29 is connected to suitable sources of biasing potential so that it is normally conducting, hence the appearance of a decreased potential on its grid renders this tube nonconducting. Immediately thereupon, the anode potential of this tube rises to impress an increased potential condition through a differentiating condenser 31 whereafter the positive excursion of the differentiated pulse is passed through a diode rectifier 32 and over a lead 33 to a suppressor grid 34 of a screen coupled phantastron type oscillator 36.

Relative potential conditions existing on the various component electrodes of the phantastron during a cycle of operation are shown in Fig. 5. Briefly discussing the operation of this phantastron it will be observed that normally the suppressor is held at a negative potential value by a biasing potential that is developed by a voltage divider consisting of resistances 41, 42 and 43 interconnected between suitable sources of positive and negative potential. When this negative bias controls, the phantastron is held from operation, however, upon the appearance of a positive going pulse upon the suppressor, the potential thereof is raised to a value approaching ground potential. This action permits an anode 44 to commence drawing current and as a result thereof the anode potential instantly drops. Anode 44 is coupled through a cathode follower tube 46 and a condenser 47 to a control grid 48 of the phantastron. Following an initial instantaneous drop in anode potential the subsequent drop in potential is manifested in a drop in control grid potential. This action results in a cutting off of current normally flowing to a screen grid 49 thereby causing the screen grid potential to rise in a very rapid fashion. It will be noted further that the screen 49 is coupled through a resistance and condenser connected in parallel to the suppressor grid 34 consequently the rise in screen grid potential causes the suppressor grid to be maintained at near ground potential and thus holds the suppressor grid at a potential condition that permits the anode 44 to draw current.

Following an initial sharp drop in anode potential, the potential will decrease in a linear fashion until such time as this anode potential approaches a space charge potential existing in the tube. Thereafter the screen grid 49 again commences to draw current causing the screen grid potential to drop. Inasmuch as the screen grid is coupled through the condenser and resistance to the suppressor grid 34, the potential on the suppressor is reduced thereby furthering the cessation of the flow of anode current. It will be noted that both the initiating and shutting off actions of the phantastron are regenerative. Therefore the potential rise and drop on both the screen and suppressor grid occur in a very rapid manner.

Looking at the characteristic wave form diagram in

Fig. 5 it may be noted that the period of the phantastron is determined by the time required for the anode potential to drop to its lowest value. Circuit parameters are selected for the phantastron that regulate the period of operation thereof to occur during a period of time which is substantially the same as the time required to receive a single start-stop signal. The initiation of operation of the phantastron 36 effectuates the initiation of a series of operations by a second phantastron 51. This phantastron has circuit components associated therewith that cause each cycle of operation thereof to occur during one-half the time that it takes to receive one impulse of the incoming signal. More particularly when the potential rise occurs on the screen grid 49 of the phantastron 36 an increased potential condition is impressed on the grid of a cathode follower tube 52 causing this tube to be placed in a conductive state for the entire time that the phantastron 36 is executing a cycle of operation. Conduction of tube 52 is accompanied by a rise in cathode potential that is impressed on a normally negatively biased suppressor grid 53 of the phantastron 51. The initial negative bias for the suppressor grid 51 is established by a voltage divider that includes a resistance 54 running through switch elements **10*f* and 10*e* to negative battery. Appearance of the increased potential on the suppressor grid causes the phantastron 51 to commence a cycle of operation much in the manner described with respect to the operation of the phantastron 36. Since the tube 52 is maintained conductive during the entire period that the phantastron 36 is executing a cycle of operation, the suppressor grid of the phantastron 51 is permitted to return to a value near ground potential at the end of each cycle, thus the phantastron 51 is permitted to execute more than one cycle of operation. Circuit parameters are selected so that the phantastron 51 executes two cycles of operation during receipt of each signal impulse; therefore, the phantastron 51 will be permitted to execute approximately thirteen and a half cycles of operation during the time that the phantastron 36** executes a single cycle of operation.

During the idle or stop time when both phantastrons are shut off there is a negative potential condition impressed on the suppressor 53 which permits a very high cut off of anode current resulting in the maintenance of the anode at a relatively high potential. If the phantastron 51 were operated as previously described by the application of positive potential to the suppressor 53, the first run down of anode potential would require a greater time than the subsequent run downs because at the conclusion of each run down, the suppressor would not return to the initial negative value. This is true since now the suppressor is maintained at a higher potential value due to the continued conduction of the tube 52 supplying a ready source of positive potential. If the suppressor cannot return to the low initial potential condition, then there would not be the complete cut off of anode current that existed during the idle conditions of the phantastron 51 and as a result the rest anode potential between cycles of operation would be at a low value thereby permitting the phantastron to execute cycles of operation in lesser periods of time.

In order to compensate for this condition a resistance 56 is interconnected between the anode and the lead running to the suppressor 53, therefore, during the idle or stop condition the low potential appearing on the cathode of the tube 52 effectuates a lowering of the potential of the anode 55. The value of the resistance 56 is not critical so long as the potential of the anode is lower than that attained during subsequent operations of the phantastron 51. When the cathode potential of the tube 52 is raised during a conduction thereof there is an immediate potential rise impressed on the anode 55 which fixes at a constant value the rest or idle potential of the anode during subsequent operations of the phantastron 51. Inasmuch as this rest or idle potential will be the same at the start of the first and all subsequent cycles of operation of the phantastron the period of each cycle will be thereby the same.

An output is derived from the phantastron 51 which is taken from a screen grid 57 and applied over a lead 58, through a diode 59 and over a lead 61 to a pair of control grids of a binary circuit generally designated by the reference numeral 62 (Fig. 1). Binary 62 consists of tubes 63 and 64 interconnected together so that upon application of each positive going pulse the conductive tube is shut off and the nonconductive tube is rendered conductive. During the idle or stop time the tube 63 is conducting; consequently when a start pulse is received and the phantastron 51 commences a cycle of operation there occurs an immediate rise in the potential on the screen 57 which rise is impressed over leads 58 and 61 to the control grid of the tube 64. Tube 64 thereupon commences conduction and due to the cross coupling of the control elements of the binary 62 the tube 63 is shut off. During receipt of each start and each intelligence impulse two operating pulses will be applied to the binary 62 and as a consequence the binary will execute one complete cycle of operation.

When the phantastron 36 completes its cycle of operation, the tube 52 is rendered nonconductive thereby effectuating a drop in cathode potential. This drop is reflected through a diode and over a lead 65 to the control grid of the tube 64; thereby insuring that tube 64 is cut off at the conclusion of the receipt of each signal. Thus, it may be understood that the binary 62 is always properly initially conditioned to maintain correct phase relationship between the generated output from the binary and the received signal impulses.

An output square wave is derived from the anode of the tube 64 and impressed on an integrating circuit 66 comprising a resistance network and a condenser 67. The potential on the anode of the tube 64 is initially at a high value and upon conduction of this tube the anode potential drops sharply. However, due to the relatively large resistance network associated with the condenser 67 there is only a slow drop in potential across this condenser. The rate of potential drop is such that the binary 62 restores to its initial condition before the condenser fully discharges. Following restoration of the binary 62 the potential impressed across the condenser 67 starts to slowly rise to thereby complete the generation of a voltage wave having the shape of an isosceles triangle. During the receipt of each complete start-stop signal, seven of these isosceles shaped voltage waves are generated (see Fig. 5).

The resistance network in the integrating circuit 66 is made sufficiently large so that the changes in potential impressed across the condenser 67 occur during the linear portion of the charge-discharge characteristic curve of the condenser. Inasmuch as the stop impulse associated with the normal start-stop telegraph signal is longer than the start and intelligence impulses, the integrated potential wave appearing across the condenser 67 tends to rise above the value attained during generation of the waves associated with these other impulses. In order that the cathode ray tube 11 be properly controlled for receipt of subsequent signals it is necessary that the isosceles waves be of constant magnitude. The present invention features an integrator clamp that holds the maximum level of all the output waves derived from the condenser 67 at a constant value.

This desirable result is attained by a coupling running from the cathode of tube 52 over a lead 69 through a resistance 71 to a junction point 72. While tube 52 is conducting during the cycle of operation of the phantastron 36 the potential at the junction point 72 is maintained at a relatively high value but upon completion of the cycle of operation of the phantastron and the accompanying shutting off of the tube 52 the potential on junction point 72 drops. With the decrease in potential at the junction point 72 the attempted rise in potential across the condenser 67 is limited by the action of a diode 73 which will conduct to hold the potential rise to a value established by a voltage divider comprising the resistance in the cathode circuit of the tube 52, the resistance 71 and a tapped resistance 74. Values are selected for these resistances so that the voltage across the condenser cannot rise above the maximum value attained during the generation of the isosceles shaped voltage waves.

The output voltage waves are thereafter impressed on an amplifier tube 76 whereafter an output is obtained from the anode circuit thereof. This amplifier output wave is impressed on a tube 77 and output from the anode circuit thereof is impressed through the switch 10*a* to a cathode follower tube 78. Output from the cathode of the tube 78 is impressed through the switch 10*g* to a control grid of a cathode follower tube 79. There is connected to the cathode of tube 79 a voltage divider circuit comprising a constantly conducting gas diode 81 and a tapped potentiometer 82 running to a suitable source of negative potential. The gas diode tube possesses the characteristic of having a constant voltage drop thereacross regardless of the state of conduction, hence the amplified isosceles shaped waves, appearing at the tap on the potentiometer 82, are not attenuated but merely reduced in voltage level.

In order to obtain a fixed left-hand reference base for the horizontal sweep of the electron beam in the cathode ray tube 11, the potentiometer 82 is adjusted so that the potential at the tap is equal to the potential existing on a junction point 83 connected between resistances 84 and 86 of a voltage divider. The adjustment of potential of the tapped potentiometer is made when no input is impressed on the tube 79 which corresponds to the condition of the tube 79 when the lowest voltage exists in the applied isosceles shaped voltage wave. Inasmuch as a horizontal gain control potentiometer 87 has equal potentials applied at both ends, there can be no shift of the reference base potential when the potentiometer 87 is adjusted to provide for various gains.

When a switch 88 is moved into its number 4 position a resistance 89 is cut out of the circuit running to the left-end of the horizontal gain potentiometer 87; consequently there will be a corresponding increase in the magnitude of the isosceles shaped waves applied to control the horizontal sweep of the electron beam in the cathode ray tube 11. This feature provides a means for examining, on an exaggerated scale, a portion of each incoming signal to more accurately determine the signal transition time.

The output wave from the horizontal gain control potentiometer 87 is impressed on the grid of a tube 91 that is connected to a tube 92 in push-pull relationship. Tubes 91 and 92 are coupled through a common cathode resistance 93 and biased so that upon an increase in potential on the grid of tube 91 the anode potential thereof will drop and at the same time the tube 92 will be reduced in conductivity thereby effectuating a corresponding rise in the anode potential of this tube. The variations in anode potentials of the two tubes are in the shape of isosceles triangle potentials 180° out of phase. These two varying anode potentials are respectively applied to a pair of horizontal deflection plates 96 and 97 in the cathode ray tube 11 and are utilized to control the horizontal sweep of the electron beam impinged on the fluorescent viewing screen of the tube.

Recalling that an isosceles-shaped wave is generated during receipt of each signal impulse then it may be noted that the horizontal deflection plates 96 and 97 cause a complete excursion of the electron beam from left to right and back again during the receipt of each impulse. In order to spread the excursions of the beam and thereby have each excursion cover a separate area of the screen during receipt of each impulse, a pair of vertical deflection plates 98 and 99 are connected to be controlled by the phantastron 36. More specifically vertical plate 98 is connected over a lead 101, through the switch 10*d*, through the switch 10*c* to the cathode of the tube 46. It is to be remembered that the potential of the cathode of this tube follows the potential of the anode of the phantastron 36; then it is apparent that the linear shape of the drop in potential of the anode also effectuates a linear run down of the potential impressed over the lead 101 to control the potential of the deflection plate 98. The other plate 99 is connected over a lead 102 to a vertical position control potentiometer 103. With this connection of circuits, the linear drop in potential impressed on the plate 98 causes the electron beam to traverse a run down from the top to the bottom of the screen during the receipt of each signal. The appearance of the trace of the electron beam on the screen is shown in Fig. 6. The small pips or deviations shown on the electron beam trace represent the transitions in the incoming signal conditions.

Attention is directed to Fig. 1 and particularly to tube 29 which is operated in accordance with the incoming signal impulses. Each time that this tube is shut off in response to a transition from a marking to a spacing condition, the anode potential thereof rises to impress a positive going potential condition on a differentiating condenser 106. A differentiated positive pulse is thereafter impressed over a lead 107 to a junction point 108 which will be recalled as being connected over the lead 102 to the vertical deflection plate 99. If this positive going pulse is impressed on the plate 99 at the same time that the electron scanning beam is in the extreme left-hand position then a resulting pip occurs at the extreme left-hand portion of the screen indicating that there is no distortion in the mark to space transition of the incoming signal impulse with respect to the comparison condition being generated by the tubes 91 and 92. It may be said that the tubes 91 and 92 are generating a perfect signal and will complete a cycle of operation during the receipt of a theoretically perfect signal impulse.

In a like manner when a space to mark transition occurs in the incoming signal, the tube 29 is rendered conductive causing the anode potential thereof to drop. A negative differentiated pulse is thereupon impressed over the lead 107, through the junction point 108 and over the lead 102 to the plate 99. If this negative going potential condition is impressed on plate 99 at the same time that the electron beam is in the extreme left-hand position then a pip will be displayed on the screen at the extreme left-hand position indicating that there is no distortion in the incoming signal impulse.

If the positive pulses applied over leads 107 and 102 do not occur at the time that the electron beam is in the extreme left-hand position, then the generated pips will be displaced from the left-hand portion of the screen and the pips will indicate that the incoming signal impulses have a bias type distortion. If the negative pulses applied over the lead 102 do not occur at the same time that the electron beam is in the left-hand position then the generated pips will be displaced to indicate that the incoming signal impulses have some type of end distortion.

Looking at Fig. 6 there is shown the face of a cathode ray tube having a scale thereon for indicating the percent of distortion in the signals. If the signals have a marking bias distortion then the generated pips occur before the electron beam starts on an excursion associated with the corresponding signal impulse. In fact the pips resulting from the signal transitions will occur during the time that the electron beam is executing the excursion associated with the previous signal impulse. Such a condition results in the generation of a pip such as disclosed in Fig. 6 and therein represented by the reference letters MB. If spacing bias is present in the incoming signals then the incoming pip will occur after the electron beam has started the excursion associated with the respective signal impulse, and the result will be an indication on the screen of a pip such as represented by the reference letters SB.

When the incoming signals are characterized by spacing end distortion the generated pips will occur before the electron beam completes the excursion associated with each impulse. The result will be a pip such as referenced in Fig. 6 by the letters SED. If the signals are characterized by having marking end distortion then the generated pips will occur during the time that the electron beam is executing excursions associated with the next subsequent signal impulses. This condition will be represented on the screen by a pip such as denoted by the reference letters MED.

In order to blank out the electron beam following the completion of a display of a signal and during the time that the beam is being returned to the initial position in preparation for generating a new display, a pair of accelerating electrodes 111 and 112 have applied thereto a decreased potential condition. This action in effect defocuses the electron beam so that the trace is not visable on the screen during the period of return. When the phantastron 36 completes a cycle of operation the potential on the screen grid 49 drops to shut off the tube 52. The cathode potential of this tube thereupon drops to cause the impression of a decreased potential condition over a lead 114 running to the accelerating electrodes 111 and 112.

Figure 7:
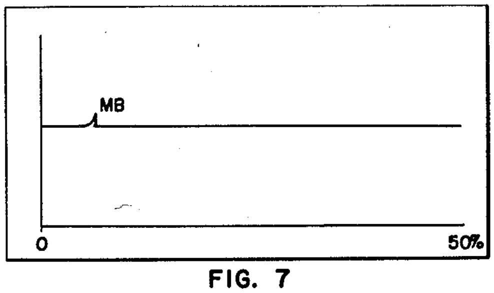

When the switch 10 is moved to the number 3 position the output of the phantastron 36 is disconnected from the vertical plates 98 and 99. In this instance the sweep of the electron beam occasioned by the operation of the tubes 91 and 92 merely results in a reciprocation of the beam in a rectilinear fashion across the face of the tube. However, in this instance the output of the tube 29 which is indicative of the incoming signals still causes pulses to be applied to the vertical deflection plates so that pips are displayed which are indicative of the transitions between signal impulses. The pips will be again displaced from the left-hand extremity of the face of the tube 11 and will be superimposed one upon the other. In this instance there will be displayed on the face of the tube a visable trace such as shown in Fig. 7.

The apparatus of the present invention also may be utilized to indicate the maximum distortion present in a group of incoming signals. In order to realize this desirable feature the switch 10 is moved to the number 4 position. Now, when the incoming signals are received the tubes 27 and 29 will operate to apply the respective anode potentials to a pair of differentiating circuits including condensers 116 and 117 and resistances 118 and 119. Diodes 121 and 122 are provided to prevent the passage of positive going pulses from reaching a junction point 123. However, negative going pulses are passed to the junction point 123. Negative going pulses emanating from the conduction of tube 27 are indicative of a mark to space transition occurring in the incoming signals whereas negative going pulses emanating from the anode circuit of tube 29 are the result of space to mark transitions occurring in the incoming signal impulses. Receipt of these negative pulses at the junction point 123 effect a reduction in the conductivity of a tube 124. Tube 124 is normally conductive since the grid thereof is connected through the junction point 123 to the source of positive battery and the anode of this tube is connected through the switch 10*d* and the switch 10*a* to the source of positive battery associated with the tube 77. When the tube 124 conducts its anode potential is held at a relatively low value and since the anode of tube 77 is connected in parallel therewith the anode of tube 77 will also be held at a low value.

In operation of the apparatus to produce this peak distortion indication, the phantastrons 36 and 51 are permitted to operate and the output from the phantastron 36 is applied to the vertical deflection plate because of the now closed contactor switch **10*d*. The isosceles shaped voltage waves appear at the tube 77 but so long as the anode potential of the tube 77 is held at a low value by the conduction of tube 124 no output can be derived therefrom. When the received signal impulses are in phase with the generated isosceles waves the transitions in incoming signal impulses shut off the tube 124 to allow the anode potential thereof to rise. As a result the anode potential of tube 77 also attempts to rise at the same time, however, at this time the highest potential of the isosceles wave is being applied to the grid of the tube 77. In this situation the anode of tube 77 is controlled by the potential condition of the isosceles waves being applied to the grid and since this value of potential is high for an in phase condition the tubes conduct and the anode potential will be maintained at a low value. Therefore, the tube 77 which normally controls the tube 78 through the switch 10*a* will not vary the conductivity of the tube 78**.

If, however, the incoming signal impulses are distorted in any way so that the incoming transitions are not in phase with the tops of the isosceles voltage wave being impressed on the grid of the tube 77 then the anode potential of this tube will not be maintained at a constant low value during signal impulse transition time. The tube 77 will only partially conduct and its anode potential will thereupon rise to impress an increased potential condition through the switch **10*a* to drive the tube 78 into a greater state of conductivity. Conduction of tube 78 causes the cathode potential thereof to rise and this rising potential is imparted through switch 10*g* to effect a charging of a condenser 126. The magnitude of this charge is entirely dependent upon the degree of displacement of the normal signal transition with respect to the isosceles waves being impressed on the grid of the tube 77**. The greater the displacement, the lower the potential impressed on the grid and the greater will be the instant rise in anode potential of this tube.

Figure 8:
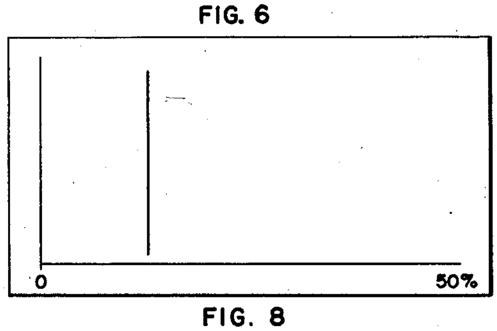
Figure 9:
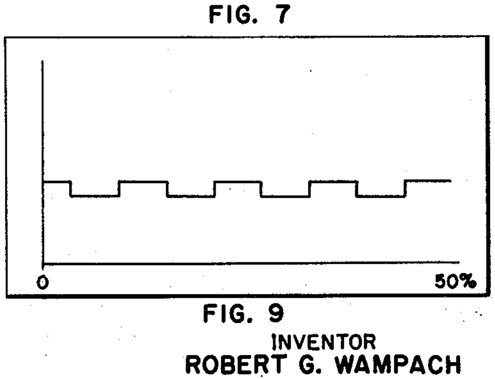

Due to a silicon diode 127, the charge cannot leak off the condenser 126. Since the condenser is connected to the grid of the tube 79, the conductivity of this tube varies directly with the magnitude of the stored charge. As the conductivity of the tube 79 is increased the cathode potential thereof rises to effectuate through the previously described voltage divider network an increase in the conductivity of the tube 91. Increases in conductivity of the tube 91 are accompanied by corresponding changes in the biasing potential applied to the horizontal deflection plates. Inasmuch as the phantastron 51 is connected to the vertical deflection plates a vertical line will appear on the screen of the cathode ray tube. The displacement of this line from left-hand end of the scale is indicative of the maximum distortion present in any impulse of a series of incoming signals. The display on the face of the tube is shown in Fig. 8.

The indicating apparatus of the present invention can also be utilized as a general purpose oscilloscope in analyzing telegraph signals. In using the indicating apparatus as an oscilloscope, the magnitude of the energy level of each signal impulse may be displayed on the face of the cathode ray tube 11. In this instance the signals or other varying conditions to be displayed on the face of the tube 11 are applied to a jack 128. The contactor switch 10 is moved into the number 1 position. The incoming varying signal potential will thereafter be impressed through the jack 128, through switch contactor elements **10*c* and 10*d* and over leads 101 to the vertical deflection plate 98 in the cathode ray tube 11. Therefore the vertical deflection plate 98** will control the electron beam so as to be positioned in accordance with the potentials of the incoming signal impulses.

When the contactor switch 10 is moved to the number 1 position a section **10*h* thereof applies positive battery on the control grid of the phantastron 51. Appearance of the increased potential on the control grid causes an immediate decrease in the normal screen grid current, and as a result there is an immediate increase in the suppressor grid potential. This action culminates in the initiation of a cycle of operation of the phantastron 51. Thereafter as a result of the continual positive bias being applied to the control grid, the phantastron will continue to run in a free running fashion. It will be recalled that during each cycle of operation of the phantastron there is an accompanying linear run down in the anode 55. As the anode runs down there is a corresponding run down in potential of the cathode of a tube 129. This decreasing cathode potential is impressed over a lead 131 through the section 10*a* of the switch contactor 10 and from there to the grid of the cathode follower tube 78. It will be remembered that the output of tube 78 eventually controls the sweep potential applied to the horizontal deflection plates 96 and 97. The electron beam will sweep across the screen of the cathode ray tube at a frequency determined by the frequency of operation of the phantastron 51. The frequency of the phantastron 51 may be regulated by adjusting a potentiometer 132 so that the output frequency may approximate the frequency of the incoming signals whereby there will be displayed on the face of the tube 11** displacements to indicate the character of each incoming signal. (For example, see Fig. 9.)

It is to be understood that the above described arrangements of apparatus and construction of elemental parts are simply illustrative of an application of the principles of the invention and many other modifications may be made without departing from the invention.

What is claimed is:

1. In an apparatus for indicating distortion in telegraph signals, a cathode ray display tube including an accelerating electrode, a pair of horizontal deflection plates, and a pair of vertical deflection plates, a first phantastron oscillator for applying a sweep potential to said pair of vertical deflection plates, a second phantastron released by the first phantastron to execute a number of cycles equal to twice the number of impulses in each telegraph signal, means responsive to the output of said second phantastron for generating potentials to control the said horizontal deflection plates, and means actuated by the completion of a cycle of operation of said first phantastron to apply a drop in potential on said accelerating electrode to defocus the electron beam during the retrace of the beam to an initial rest position.

2. In apparatus for visually displaying signal impulse transitions of telegraph signals on a screen of a cathode ray tube, positively biased accelerating electrodes within the tube for projecting an electron beam on a screen, a first oscillator circuit having a period of operation equal to the duration of a telegraph signal, means for applying the output of the first oscillator to control the vertical sweep of the electron beam, means responsive to each signal transition for further deflecting said electron beam, a second oscillator having a period of oscillation equal to twice the frequency of the signal impulses, means for squaring and integrating the output of the second oscillator, means for applying the output of the integrating means to control the horizontal sweep of the electron beam, and means controlled by the first oscillator completing a cycle of operation for reducing the positive bias on the accelerating electrodes to defocus the electron beam during its restoration to the point of origin.

3. In an apparatus for visually displaying signal impulse transitions of a telegraph signal on a screen of a cathode ray tube, means for directing an electron beam on said screen of said tube, a first phantastron oscillator circuit having a period of operation equal to the duration of a telegraph signal, a negatively biased suppressor grid for said first oscillator, means responsive to a telegraph signal for overcoming said negative bias, means for applying the output of the first oscillator to control the vertical sweep of the electron beam, a second phantastron oscillator having a period of operation equal to twice the signal impulse frequency, a negatively biased suppressor grid for holding said second oscillator from operation, a positively biased anode for said second oscillator, means actuated by said first oscillator for reducing the negative bias on the suppressor and the positive bias on the anode of the second oscillator, means for squaring and integrating the output of the second oscillator, means for applying the integrated output to control the horizontal sweep of the electron beam, and means responsive to each signal impulse transition for vertically deflecting the electron beam.

4. In an apparatus for visually displaying the signal impulse transitions of a telegraph signal on a cathode ray tube, means for directing an electron beam on a screen of said tube, a first phantastron oscillator having a period of operation equal to the duration of a telegraph signal, a second phantastron oscillator having a period of operation equal to twice the signal impulse frequency, negatively biased suppressor grids in both said oscillators for holding said oscillators from operation, means responsive to an incoming telegraph signal for overcoming the bias on the suppressor of the first oscillator, means actuated by the first oscillator for overcoming the negative bias on the suppressor of the second oscillator, an integrator circuit actuated by the output of the second oscillator, means for applying the output of the first oscillator to control the vertical sweep of the electron beam in the cathode ray tube, means for applying the output of the integrator circuit to control the horizontal sweep of the electron beam, means responsive to each transition in signal impulse level for generating a pulse and applying said pulse to further vertically deflect the electron beam, and means actuated by the completion of a cycle of operation of the first oscillator for holding a biasing potential on the integrator that is no greater than the maximum output potential of the integrator circuit.

5. In an apparatus for visually displaying transitions in signal impulses of telegraph signals on the screen of a cathode ray tube, a first phantastron oscillator having a period of operation equal to the duration of a telegraph signal, a positively biased anode in said phantastron oscillator adapted to linearly drop in potential during the operation of the oscillator, means responsive to an incoming signal for initiating a cycle of operation of said oscillator, means for applying the dropping anode potential to control the vertical sweep of an electron beam in the cathode ray tube, a second phantastron oscillator having a period of operation equal to twice the signal impulse frequency, means actuated by the first oscillator for initiating the second oscillator into operation, a binary circuit operated by said second oscillator for producing a square wave output, means for integrating the square wave output, means for applying said integrated square wave to control the horizontal sweep of the electron beam, means responsive to signal impulse transitions for further deflecting the vertical position of the electron beam to give a visual indication of the transitions, and means operated by the completion of a cycle of operation of the first oscillator for applying a conditioning potential to set the binary circuit in a predetermined condition in anticipation of receipt of the next signal.

6. In an apparatus for displaying on the screen of a cathode ray tube indications of distortion of start-stop multi-impulse telegraph signals, a cathode ray tube having a pair of horizontal deflection plates, a pair of vertical deflection plates and an accelerating anode for projecting an electron beam between said plates, a first phantastron oscillator characterized by a linear rundown of anode potential during a cycle of operation thereof, circuit elements connected to said phantastron for imparting a period of operation thereto equal to the period of a single start-stop signal, means responsive to a start impulse for initiating a cycle of operation of said first phantastron, means for applying the drop in anode potential of said first phantastron to control the potential applied to the vertical plates to give a linear sweep to the electrode beam, a second phantastron characterized by a linear rundown of anode potential during a cycle of operation thereof, circuit elements connected to said second phantastron for imparting a period of operation thereto equal to one-half the period of a single signal impulse, means operated by the first phantastron to release the second phantastron for operation, means controlled by the first phantastron for lowering the anode potential of the second phantastron at the instant of release of said second phantastron, means responsive to each two cycles of operation of said second phantastron for generating a saw tooth wave, means for applying said saw tooth waves to the horizontal deflection plates in concordance with receipt of the signal impulses, means responsive to each transition in signal impulses for generating a pulse, means for applying said transition pulses onto the vertical deflection plates, and means responsive to a completion of operation of said first phantastron for impressing a decreased potential on said accelerating electrodes to defocus the electron beam during its retrace time.

References Cited in the file of this patent

UNITED STATES PATENTS

| | | |
|---|---|---|
| 2,077,172 | Hearn | Apr. 13, 1937 |
| 2,178,471 | DeBruin | Oct. 31, 1939 |
| 2,712,038 | Carver | June 28, 1955 |